US008200778B2

(12) United States Patent
Edwards et al.

(10) Patent No.: US 8,200,778 B2
(45) Date of Patent: Jun. 12, 2012

(54) METHOD FOR INTEGRATING PLUG-IN SECURITY PANEL MODULE WITH NETWORK INTERFACE MIDDLEWARE

(75) Inventors: Lewin Edwards, Forest Hills, NY (US); Olivier Chantelou, Valbonne (FR); Laurent Legris, Grasse (FR)

(73) Assignee: Honeywell International Inc., Morristown, NJ (US)

( * ) Notice: Subject to any disclaimer, the term of this patent is extended or adjusted under 35 U.S.C. 154(b) by 429 days.

(21) Appl. No.: 12/481,839

(22) Filed: Jun. 10, 2009

(65) Prior Publication Data

US 2010/0318627 A1 Dec. 16, 2010

(51) Int. Cl.
*G06F 15/16* (2006.01)

(52) U.S. Cl. ........................................................ 709/217

(58) Field of Classification Search .......... 709/203–207, 709/213–223, 227–238, 240–250; 726/22–28
See application file for complete search history.

(56) References Cited

U.S. PATENT DOCUMENTS

| | | | | |
|---|---|---|---|---|
| 4,292,669 | A * | 9/1981 | Wollum et al. | 710/64 |
| 6,179,489 | B1 * | 1/2001 | So et al. | 718/102 |
| 6,298,370 | B1 * | 10/2001 | Tang et al. | 718/102 |
| 7,512,969 | B2 * | 3/2009 | Gould et al. | 726/4 |
| 7,644,151 | B2 * | 1/2010 | Jerrim et al. | 709/224 |
| 7,895,665 | B2 * | 2/2011 | Gould et al. | 726/29 |
| 2003/0071724 | A1 | 4/2003 | D'Amico | |
| 2007/0033273 | A1 * | 2/2007 | White et al. | 709/223 |
| 2010/0153853 | A1 * | 6/2010 | Dawes et al. | 715/736 |
| 2010/0275027 | A1 * | 10/2010 | Belrose et al. | 713/176 |

OTHER PUBLICATIONS

European Search Report corresponding to European Application No. 10 16 5103, dated Sep. 10, 2010.

* cited by examiner

*Primary Examiner* — Asad Nawaz
(74) *Attorney, Agent, or Firm* — Husch Blackwell

(57) ABSTRACT

A security system is provided. The security system includes a security processor having a plurality of inputs that receive signals from security sensors in a secured area and at least one data output path that couples the received signals from the security sensors to a central monitoring station and a network interface device coupled to the security processor that couples signals between the security processor and central monitoring station through a network connection, said network interface selected from the group consisting of a television set-top box, digital video recorder, DSL modem, fiber-optic modem, VSAT satellite transceiver and personal computer, and said network connection selected from the group consisting of a public or proprietary network connection, an Internet connection, a PSTN connection, and a cable TV distribution system connection.

14 Claims, 3 Drawing Sheets

METHOD FOR INTEGRATING PLUG-IN SECURITY PANEL MODULE WITH NETWORK INTERFACE MIDDLEWARE

FIELD OF THE INVENTION

The field of the invention relates to security systems and more particularly to methods of simplifying security systems.

BACKGROUND OF THE INVENTION

Security systems are generally known. Such systems typically consist of some form of intrusion detection of a secured area coupled with an alarm panel. Where the secured area is a building, the intrusion detectors may be simply be provided in the form of door or window switches.

In more sophisticated systems, intrusion detection of a building's interior may be provided in the form of motion sensors. Motion sensors can be infrared or ultrasonic.

In addition to motion detectors, many homes are also protected through the use of glass breakage detectors. In this case, the glass breakage detectors are especially constructed to respond to the specific frequencies associated with breaking glass.

In each case, the intrusion detectors are connected to an alarm panel. The alarm panel, in turn, may be provided with an audible alarm to alert authorized occupants to the presence of intruders.

The alarm panel may, in turn, be connected to a remotely located monitoring station. The monitoring station has the additional advantage of being able to summon police even when the normal occupants of a secured area are not present.

While exiting security systems are effective, they are expensive to install and can be unreliable. Once installed, security systems often require a separate control panel that detracts from the appearance of most homes. Because of the importance of security systems, a need exists for more reliable systems that are and inexpensive to install and operate.

DETAILED DESCRIPTION OF AN ILLUSTRATED EMBODIMENT

Figure 1:
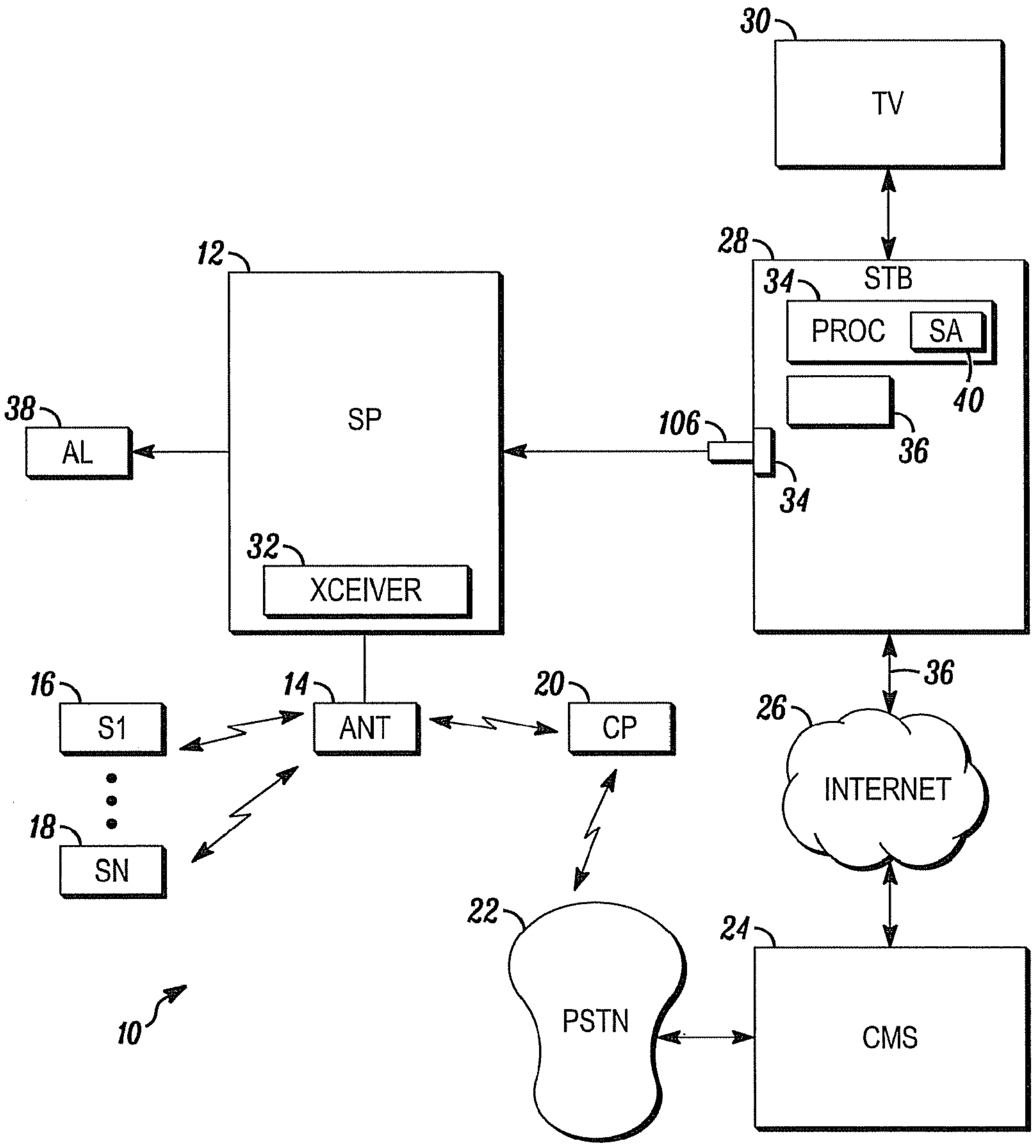
FIG. 1 is a block diagram of a security system in accordance with an illustrated embodiment of the invention.

FIG. 1 is a block diagram of a security system 10 shown generally in accordance with an illustrated embodiment of the invention. Under the illustrated embodiment, a security processor 12 monitors a number of security sensors 16, 18 for security breaches. Upon detection of a breach, the security processor 12 notifies a central monitoring station 24 through a network interface 28 and network connection (e.g., the Internet) 26.

The security sensors 16, 18 may be any appropriate sensing device (e.g., window or switches, motion detectors, security camera etc.). The security processor 12 may communicate with the security devices 16, 18 through a radio frequency (RF) transceiver 100 and antenna 14.

While the primary communication connection between the security processor 12 and central station 24 may be through the network interface 28 and Internet 26, local requirements may necessitate a secondary connection. The secondary connection may be provided by a cell phone 20. In this case, the transceiver 100 may operate as a Bluetooth device communicating with the cell phone 20 (e.g., a model 7845i-GSM communicator with integrated Bluetooth radio) under a Bluetooth format. The cell phone 20, in turn, may forward messages from the security processor 12 to the central monitoring station 24 through the public switch telephone network (PSTN) 22.

The network interface 28 may be any appropriate network device (e.g., television set-top box, digital video recorder, DSL modem, fiber-optic modem, VSAT satellite transceiver, personal computer, etc.) with a broadband network connection. While the network connection is shown as being established through the Internet 26, it should be understood that the network connection may also include any public or private network, the PSTN or cable TV distribution system.

In general, the security system 10 incorporates existing high speed connections within a user's home to provide a low-cost, reliable security system. For example, in the case of a set-top box 28, a processor within the set-top box 28 often contains considerable processing power along with a broad band network connection. Moreover, many set-top boxes have an integral universal serial bus (USB) connection (e.g., receptacle) 34. Although other connector types (e.g., PCMCIA cardbus, ISO7816 smartcard slots, FireWire port, etc.) may also be present on the set-top box.

The set-top box 28 typically contains an operating system and a middleware layer that insulates application software from the operating system. The middleware layer is typically an interpretive runtime interface (e.g., one or more JAVA applications) with custom classes to control the special hardware present on the system. Third party applications can be installed into this middleware layer.

Figure 2:
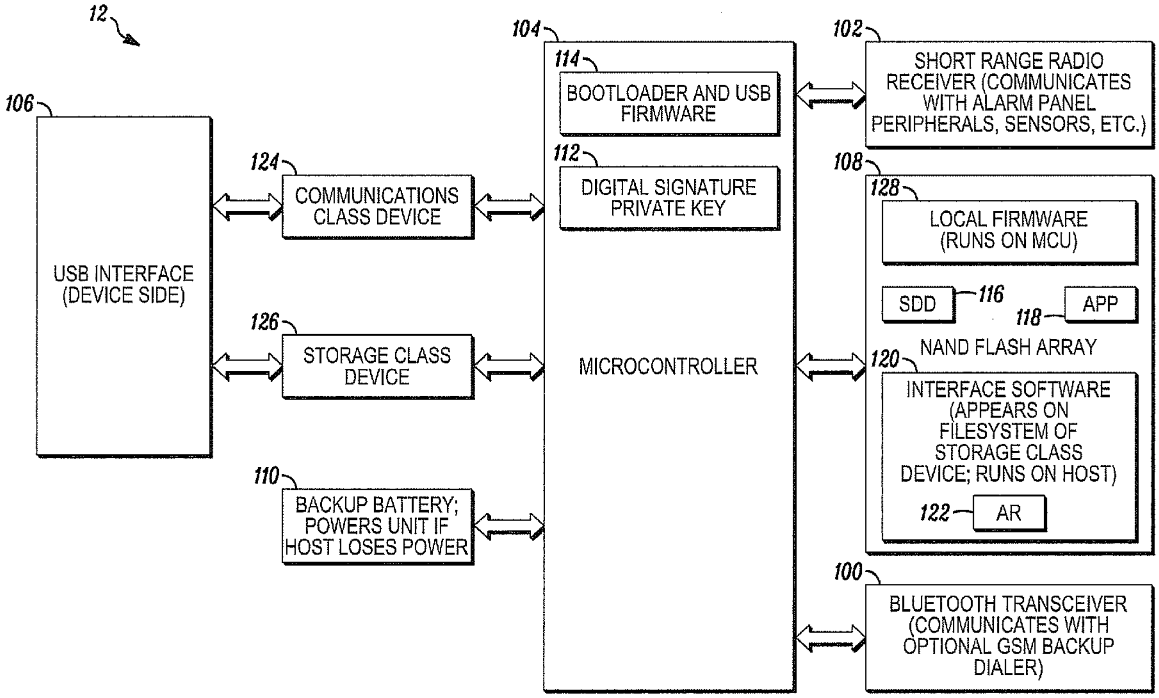
FIG. 2 is a block diagram of a security processor that may be used with the system of FIG. 1.

FIG. 2 is a block diagram of the security processor 12. As shown, the processor 12 contains a short-range radio receiver 102. This receiver 102 communicates with the various sensors, keypads and other alarm peripherals around the house. Fault reporting to the central station 24 is routed through the set-top box's broadband Internet connection. The security processor 12 may also contain a backup GSM dialer connected to the cell phone 20 wirelessly.

The security processor 12 consists of a miniature board containing a microcontroller 104, a host interface (USB in this example) 106, a mass-storage device (e.g., a NAND flash array) 108, the short-range radio receiver 102 and an optional Bluetooth transceiver 100. In some jurisdictions, the device may also require its own backup battery 110 for power supply if the host experiences a power failure.

The security processor 12 is designed to be plugged (or inserted, or internally integrated as a factory-installed option) into a host device, assumed to be either a proprietary set-top box (STB), a media player appliance such as Apple TV or a Windows Media PC, a standalone Network Attached Storage (NAS) device such as Apple Time Capsule or Buffalo Linkstation, a game console such as Playstation 3, or a standard desktop PC. Normally, the security processor 12 is powered from the host and the battery (if any) is kept charged from this power supply. In the event of a failure of primary power, the security processor 12 can function for a certain predetermined minimum backup period operating off the battery.

It should be noted that the microcontroller 104 presents a dual, hybrid personality to the host 12. One side of this personality is a communications class device, essentially a virtual serial port. The other side of this personality is a mass-storage device. Both of these devices are represented by standard USB classes; any operating system (embedded or consumer device) that supports the appropriate class devices will support any compliant USB device without the need for additional proprietary drivers.

The NAND flash array 108 stores three sets of data files including system configuration data (SDD) 116, one or more software applications (APPs) 118 and a user interface (UI) 120. For example, the SDD 116 may include the serial numbers of the installed peripherals, site serial number, user names, I18N (internationalization) files, and so forth. A power-on reset (POR) software application 114 is also provided that is designed to run on the microcontroller 104 during initialization. At POR, the microcontroller 104 runs an internal bootloader application which verifies the integrity of the files (e.g., APP, UI, etc.) against a factory-programmed digital signature key 112.

The APP files 118 may contain one or more processors 36 that provide the functionality of the security system. The APP processors 36 operate in conjunction with the data within the SDD files 116 to detect activation of the sensors 16, 18 and to send alarms to the central station 24.

The UI files contain one or more applications designed to operate within the network interface 28 to provide a user interface with the security processor 12 using the graphical user interface (GUI) of the network interface 28. These may consist of several different packages according to the middleware within the network interface 28 that is to be supported. A filesystem utility within the UI files 120 may contain an "autorun.inf" file and corresponding autorun executable, to be run automatically on a processor 34 (e.g., Windows hosts, a collection of Java classes (or .jar) to be run on a Java-based solution, etc.) within the network interface 28.

All three of these data sets or files 116, 118, 120 are visible as files in the storage device 108 if the security processor 12 is inserted into or connected to a standard PC. Thus, software upgrades or a change of language can be offered to customers with a simple "drag and drop" mechanism. Obviously, upgrades can also be "pushed" to the security processor 12 over the broadband connection 36 of the network interface 28.

In general, the security processor 12 may be inserted into or simply connected to the network interface 28. Connection may be accomplished by inserting a USB plug 106 of the security processor 12 into a USB receptacle of the network interface 28. When the plug 12 is inserted, the following sequence of events occurs. First, the security processor 104 executes the bootloader 104. The bootloader 104 verifies the integrity of the SDD 116, the APP 118 and UI files 120 by calculating a digital signature for each and comparing the respective signature with a reference signature 112.

Next, the processor (host) 34 will discover the COMM interface 124 and storage (STG) class interfaces 126 within the security processor 12 through the USB connector 106. Through the STG interface 126, the processor 34 will find the autorun application 122 and, in response, automatically executes the autoex application. The autoex application locates and loads the APP and UI applications into the processors 34, 36 and automatically configures a security application 40 within one or both of the processors 34, 36 substantially without any user input.

In this case, one processor 34, 36 may be a user interface application that controls the GUI through which the user interacts with the security system 10. The other processor 34, 36 may perform the security functions of detecting the activation of sensors 16, 18 and reporting such activations to the central monitoring station 24.

The UI code of the UI applications is, as far as the security processor 12 is concerned, simply a file of binary data in flash memory 108. It is transferred verbatim to the host 28, and automatically installed by the host 28 in accordance with the contents of the executive file. It can be updated at any time.

Given standardized middleware between hosts 12, 28, the security processor 12 operates simply as a plug-and-play across different STB vendor platforms 28. Thus it is immune to any need for changes required by different communication formats (e.g. ADSL vs. cable vs. fiber optic).

The UI code executing within the processor 34 communicates with the security processor 12 using the COMM interface 124. The security processor 12 may operate to drive the short range radio 102 and Bluetooth interfaces 100 (the COMM and STG code for radios 100, 102 is almost negligible in size and can be taken more or less verbatim from vendor application notes). Therefore it is not necessary to have complex video and audio codecs, or an immensely powerful processor, in the security processor 12.

Once the UI applications and APP applications have been installed into the processors 34, 36, the system 10 may display a set up screen on a display 30 for the benefit of the user. In this case, the user may use a remote control device (e.g., a TV remote where the user interface 28 is a set-top box to set up the security system 10. Setting up the security system 10 may include entry of a name of the user and an address of the secured area.

The user may also enter identifiers of each of the sensors 16, 18. For example, if a sensor (e.g., 16) is associated with a front door of a home of the user, then the user may enter the alphanumeric indicator "door1" or "front door."

Upon completion of entry, the user may activate an ENTER key. Upon activation of the ENTER key, the processor 34, 36 may save the entered data to the SDD file 116 within the security processor 12. The processor 34, 36 may also retrieve a start up Internet address (e.g., a universal resource locator (URL), universal resource indicator (URI), etc.) of the remote monitoring center 24. The processor 34, 36 may send an initial registration message to the remote monitoring center 24.

In response, a processor (not shown) within the remote monitoring center 24 may use the address of the user to identify a closer remote monitoring center 24 and reply with the Internet URL or URI of a more convenient remote monitoring center 24. The processor 34, 36 may receive the URL or URI of the more convenient remote monitoring center 24 in the SDD file 116.

The user may activate and deactivate the security system 10 through a keypad (not shown) associated with one of the sensors 16, 18. Alternatively, the user could use a security icon display on the TV 30 to access an ON and OFF feature of the security system through the GUI of the network interface 28.

In the event of an intrusion into the secured area, the intrusion may activate one or more of the sensors 16, 18. In response, the security application 40 operating on the processor 34 may detect the activation through the security processor 12. The security 40 may compose a message to the remote monitoring station 24 notifying the remote station 24 of the security breach including a name and address of the user as well as an identifier of the sensor 16, 18. The security processor 40 may also activate a local audible alarm 38.

Note that if the POR digital signature test discussed above should fail, the security processor 12 can revert into a fallback mode. In this mode, it presents a limited filesystem to the host, containing only a "recovery" application. This recovery application is resident in ROM 128 to guarantee availability. The only function of the recovery application is to connect to the alarm central station 24 and force the network interface 28 to download a good copy of the SCD, APP and UI to refresh a corrupted NAND flash.

Figure 3:
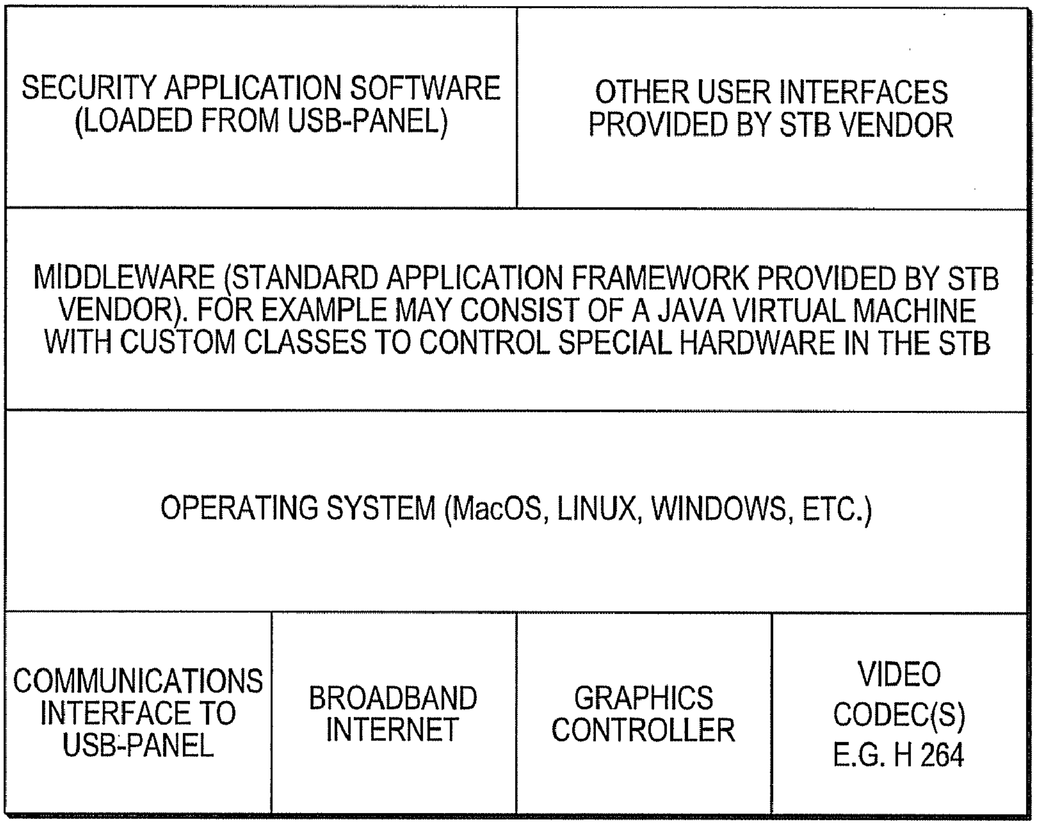
FIG. 3 depicts a software architecture that may be used by the system of FIG. 1.

The general software architecture running on the network interface 28 with an inserted security processor 12 can be approximated by the diagram of FIG. 3. It may be observed that, for example, if the user has a wireless video camera streaming H.264 data, the data stream can be passed through from the security processor 12 to the UI of the processor 34, and then be decoded by the hardware already present in the network interface 28 for display on the user's television or computer screen 30. Other peripherals that can be attached to the network interface 28 can be used in the same manner.

Other applications, not necessarily limited to security, can be supported in the same manner. Essentially, the security processor 12 becomes a turnkey device that, when inserted into an network interface 28, immediately adds functionality to the network interface 28. Other possible applications include HVAC, remote site monitoring, scientific data collection, and so forth.

The scope of the system 10 also covers situations where the security application software is delivered by other methods. For example, the system 10 may be used for remote provisioning (of a cable/DSL/fiber optic set-top box, by the cable provider or a third party with access to the provider's systems). In such a case the application software to support the security processor 12 is delivered to the end-user's hardware via a "push" mechanism in the same manner that firmware upgrades may be installed by the service provider. Manually-initiated installation of the software on the network interface 28, e.g. by the installer using a "secret" menu item in the network interface's menu structure to force the box to download updated software from the network or from a removable media device. Software may also be downloaded over the Internet, or installed from a CD or other removable media, in the case where the "set top box" is a general-purpose PC.

A specific embodiment of method and apparatus for providing a system during startup has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A security system comprising:

a security processor having a plurality of inputs that receive signals from security sensors in a secured area and at least one data output path that couples an information content of the received signals from the security sensors to a central monitoring station, the security processor further comprising:

a connector plug;

a microcontroller coupled between the plurality of inputs and the connector plug and between a non-transitory computer readable memory and the connector plug;

and a security application within the non-transitory computer readable memory, wherein the microcontroller presents a dual, hybrid personality through the connector plug, the first personality is as a communication class device presented by a COMM interface through the connector plug and the other personality is as a mass storage device presented by a storage class interface through the connector plug;

and a network interface device coupled to the security processor, the network interface device is configured to discover the COMM interface and mass storage interface through the connector plug upon coupling of the network interface device to the security processor and upon coupling of the security processor to the network interface device, the network interface device automatically loads and configures the security application within a processor of the network interface device without any user input, the security application executing on the processor of the network interface device detects activation of the sensors in the secured area through the COMM interface, composes messages notifying the central monitoring station of security breaches and couples the composed messages between the processor executing the security application and central monitoring station through a network connection, said network interface device selected from the group consisting of a television set-top box, digital video recorder, DSL modem, fiber-optic modem, VSAT satellite transceiver and personal computer, and said network connection selected from the group consisting of a public or proprietary network connection, an Internet connection, a PSTN connection, and a cable TV distribution system connection wherein a digital signature in a computer readable medium of the security processor is compared with a calculated digital signal to determine whether the security application is corrupted.

2. The security system as in claim 1 further comprising an autorun executable file in a computer readable medium of the security processor that is uploaded from the security processor by the network interface for execution on the network interface.

3. The security system as in claim 1 further comprising a bootloader application in a computer readable medium that executes on a processor of the security processor to calculate a digital signature of a security application that executes on the network interface.

4. The security system as in claim 1 further comprising a recovery application in a computer readable medium of the security processor that is executed in the network interface to download a replacement copy of the security application when the compared digital signatures indicate that the security application is corrupted.

5. A security system comprising:

a security processor having a plurality of inputs that receive signals from security sensors in a secured area and at least one serial output that couples an information content of the received signals from the security sensors to a central monitoring station, the security processor further comprising:

a connector plug;

a microcontroller coupled between the plurality of inputs and the connector plug and between a non-transitory computer readable memory and the connector plug; and a security application within the non-transitory computer readable memory, wherein the microcontroller presents a dual, hybrid personality through the connector plug, the first personality is as a communication class device presented by a COMM interface through the connector plug and the other personality is as a mass storage device presented by a storage class interface through the connector plug; and a television set-top box coupled to the security processor, the television set-top box is configured to discover the COMM interface and mass storage interface through the connector plug upon coupling of the television set-top box to the security processor and the television set-top box automatically loads and configures the security application within a processor of the television set-top box without any user input, the security application executing on the processor of the television set-top box detects activation of the sensors in the secured area through the COMM interface, composes messages notifying the central monitoring station of security breachs and couples the composed messages between the television set-top box and central monitoring station through an Internet connection wherein a digital signature in a computer readable medium of the security processor is compared with a calculated digital signal to determine whether the security application is corrupted.

6. The security system as in claim 5 further comprising a universal serial bus coupling the security processor to the set-top box.

7. The security system as in claim 5 further comprising a user interface disposed within a computer readable medium of the security processor and uploaded to the set-top box during initialization of the security system that displays messages on a display of the set-top box and that receives information from a user through a remote control of the set-top box.

8. A security system comprising:

a plurality of security sensors disposed in a secured area;

a security processor that receives signals from the security sensors in the secured area and at least one data output path that couples an information content of the received signals from the security sensors to a central monitoring station, the security processor further comprising:

a connector plug;

a microcontroller coupled between the plurality of inputs and the connector plug and between a non-transitory computer readable memory and the connector plug;

and a security application within the non-transitory computer readable memory, wherein the microcontroller presents a dual, hybrid personality through the connector plug, the first personality is as a communication class device presented by a COMM interface through the connector plug and the other personality is as a mass storage device presented by a storage class interface through the connector plug;

and a network interface device coupled to the security processor, the network interface device is configured to discover the COMM interface and mass storage interface through the connector plug upon coupling of the network storage device to the security processor and the network interface device automatically loads and configures the security application within a processor of the network interface device without any user input, the security application executing on the processor of the network interface device detects activation of the sensors in the secured area through the COMM interface, composes messages notifying the central monitoring station of security breaches and couples the composed message between the processor executing the security application and central monitoring station through a network connection wherein the network interface further comprises a device selected from the group consisting of a television set-top box, digital video recorder, DSLmodem, fiber-optic modem, VSAT satellite transceiver and personal computer and the network connection further comprises a network connection selected from the group consisting of a public or proprietary network connection, an Internet connection, a PSTN connection, and a cable TV distribution system connection;

wherein a digital signature in a computer readable medium of the security processor is compared with a calculated digital signal to determine whether the security application is corrupted.

9. The security system as in claim 8 further comprising a universal serial bus coupling the security processor to the network interface.

10. The security system as in claim 8 further comprising an autorun executable file in a computer readable medium of the security processor that is uploaded from the security processor by the network interface for execution on the network interface.

11. The security system as in claim 10 further comprising the security application in the computer readable medium of the security processor that is uploaded by the autorun executable file from the security processor to the network interface for execution on the network interface.

12. The security system as in claim 10 further comprising a user interface application in a computer readable medium of the security processor that is uploaded by the autorun executable file from the security processor to the network interface for execution on the network interface.

13. The security system as in claim 11 further comprising a bootloader application in a computer readable medium that executes on a processor of the security processor to calculate a digital signature of the security application that executes on the network interface.

14. The security system as in claim 13 further comprising a recovery application in a computer readable medium of the security processor that is executed in the network interface to download a replacement copy of the security application when the compared digital signatures indicate that the security application is corrupted.

* * * * *